(12) United States Patent
Takahama

(10) Patent No.: US 6,871,821 B2
(45) Date of Patent: Mar. 29, 2005

(54) COCKPIT DOOR OF AIRCRAFT

(75) Inventor: Hironobu Takahama, Tokyo (JP)

(73) Assignee: Jamco Corporation, Tokyo (JP)

( * ) Notice: Subject to any disclaimer, the term of this patent is extended or adjusted under 35 U.S.C. 154(b) by 0 days.

(21) Appl. No.: 10/735,624

(22) Filed: Dec. 16, 2003

(65) Prior Publication Data

US 2004/0144895 A1 Jul. 29, 2004

(30) Foreign Application Priority Data

Jan. 24, 2003 (JP) .......................................... 2003-015753

(51) Int. Cl.[7] .............................. B64C 1/14; B64C 11/00
(52) U.S. Cl. ................................ 244/129.5; 244/118.5; 244/121; 244/133; 89/36.11; 89/36.01; 89/36.02
(58) Field of Search .............................. 89/36.01–36.02, 89/36.11; 244/129.5, 118, 121, 133, 118.5; 49/501, 171, 463; 109/49.6

(56) References Cited

U.S. PATENT DOCUMENTS

| | | | | |
|---|---|---|---|---|
| 4,111,097 A | * | 9/1978 | Lasker | 89/36.02 |
| 4,912,877 A | * | 4/1990 | Strydom | 49/171 |
| 5,463,929 A | * | 11/1995 | Mejia | 89/36.02 |
| 6,240,858 B1 | * | 6/2001 | Mandall | 89/36.02 |
| 6,474,599 B1 | | 11/2002 | Stomski | 244/118.5 |
| 6,562,435 B1 | * | 5/2003 | Brillhart et al. | 89/36.02 |
| 6,568,310 B2 | * | 5/2003 | Morgan | 89/36.02 |
| 6,698,690 B2 | * | 3/2004 | Novak et al. | 244/121 |
| 6,702,230 B2 | * | 3/2004 | Movsesian et al. | 244/118.5 |
| 6,702,232 B2 | * | 3/2004 | Dovey et al. | 244/121 |

* cited by examiner

Primary Examiner—Michael J. Carone
Assistant Examiner—Lulit Semunegus
(74) Attorney, Agent, or Firm—Westerman, Hattori, Daniels & Adrian, LLP

(57) ABSTRACT

The cockpit door has a hinge on one side and a latch device on the other side that can be operated only from the cockpit side. To the inner side of the door panel is mounted a reinforcement member 100 having a body formed by laminating layers of aromatic polyamide fiber sheets and thermoplastic adhesive and subjecting the same to hot pressing to form an integral member. Mounting portions 150 and 160 are formed to the rim portion of the reinforcement member body 110, and rivet inserting holes 180 are machined to the portions. The mounting portions are bent by 90 degrees, and fixed to a frame using rivets.

4 Claims, 8 Drawing Sheets

COCKPIT DOOR OF AIRCRAFT

FIELD OF THE INVENTION

The present invention relates to a cockpit door interposed between a cockpit and a passenger cabin of an aircraft.

DESCRIPTION OF THE RELATED ART

In current years, the need to improve the strength of the cockpit door to counter the threat of terrorism has increased, and various measures have been conceived.

For example, U.S. Pat. No. 6,474,599 discloses a system for improving the security of the aircraft by providing an independent security chamber interposed between the pilot area or cockpit and the passenger area.

According to the system disclosed in the above-mentioned patent document, there is a need to retain a space for building the security chamber between the cockpit and the passenger cabin, by which the efficient space within the cabin is reduced.

SUMMARY OF THE INVENTION

Therefore, the present invention provides a cockpit door of an aircraft that realizes improved security by increasing the strength of the cockpit door itself, and equipped with means for communicating the cockpit with the cabin and to provide a route for the pilot to escape in case of occurrence of a decompression in which the pressure within the cabin drops suddenly.

The cockpit door of an aircraft according to the present invention comprises as basic means a reinforcement member fixed to an interior of the door, the reinforcement member comprising a body formed by laminating multiple layers of aromatic polyamide fiber sheets with thermoplastic adhesive and integrating the same via hot pressing, and a mounting portion formed to a rim portion of the body, the mounting portion bent 90 degrees and fixed to the door by rivets. Further, the cockpit door of an aircraft comprises a flap mounted to an inner area of the door via a hinge allowing the flap to be opened and closed, and a reinforcement member fixed to an interior of the flap, the reinforcement member comprising a body formed by laminating multiple layers of aromatic polyamide fiber sheets with thermoplastic adhesive and integrating the same via hot pressing, and a mounting portion formed to a rim portion of the body, the mounting portion bent 90 degrees and fixed to the flap by rivets.

Furthermore, the mounting portion of the cockpit door is created by reducing the number of sheets being laminated compared to the body, and has holes formed thereto through machining for inserting rivets.

Moreover, the reinforcement member is formed by first laminating a small number of sheets and integrating the same via hot pressing to form a layered structure, and then laminating a predetermined number of the layered structure together.

DETAILED DESCRIPTION OF THE PREFERRED EMBODIMENT

Figure 1:
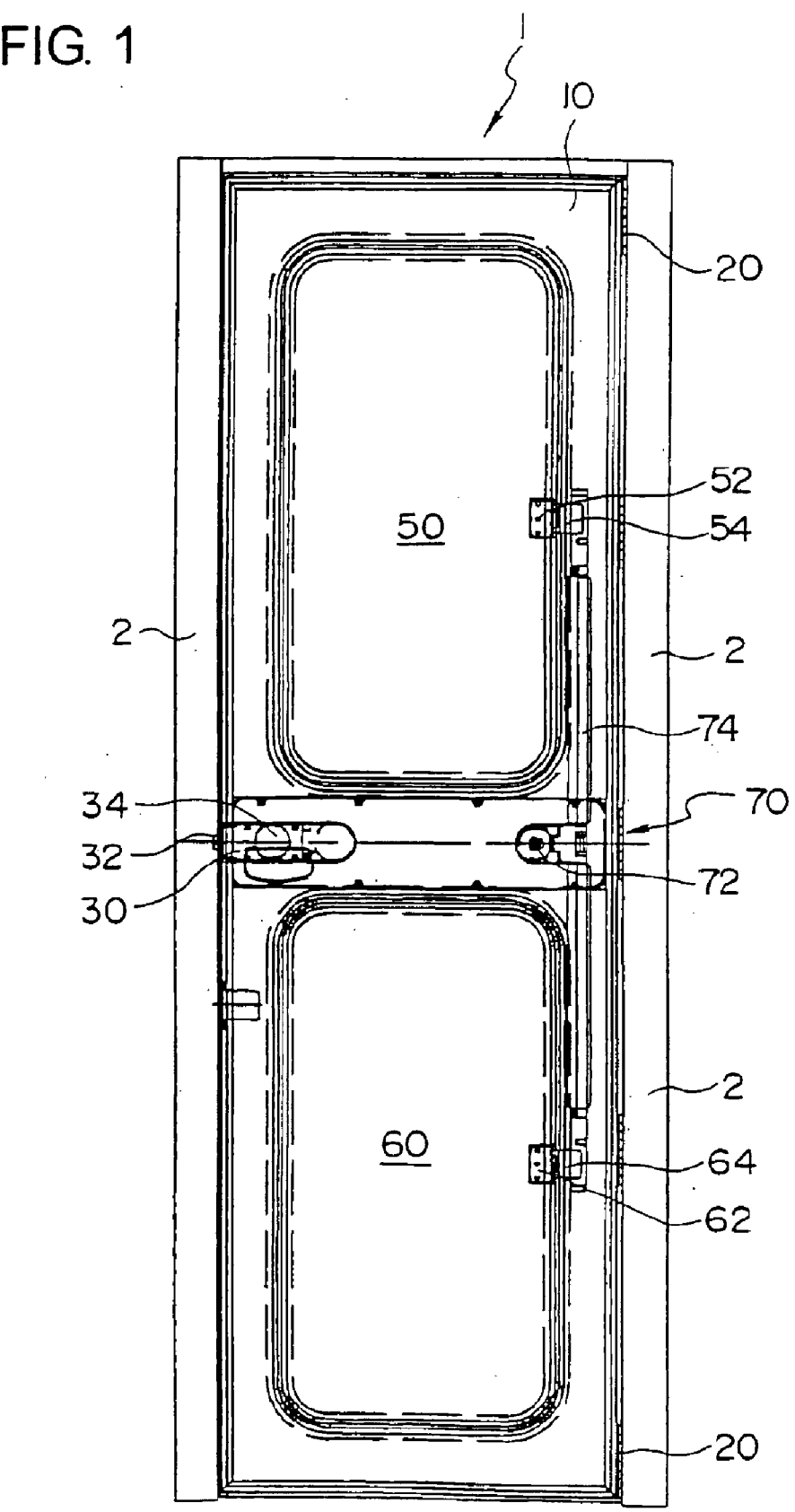
FIG. 1 is a front view of the cockpit door according to the present invention.
Figure 2:
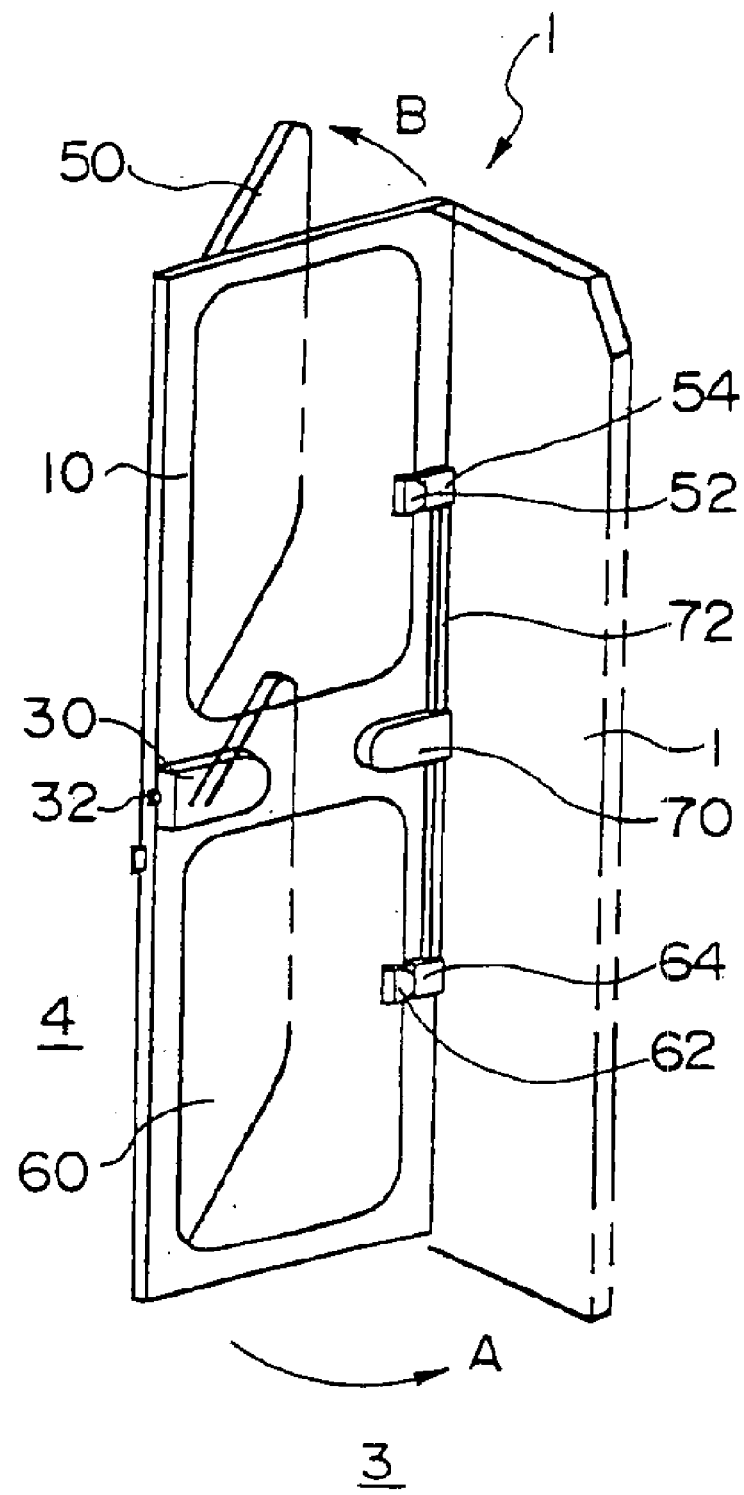
FIG. 2 is an explanatory view showing the action of the cockpit door according to the present invention.
Figure 3:
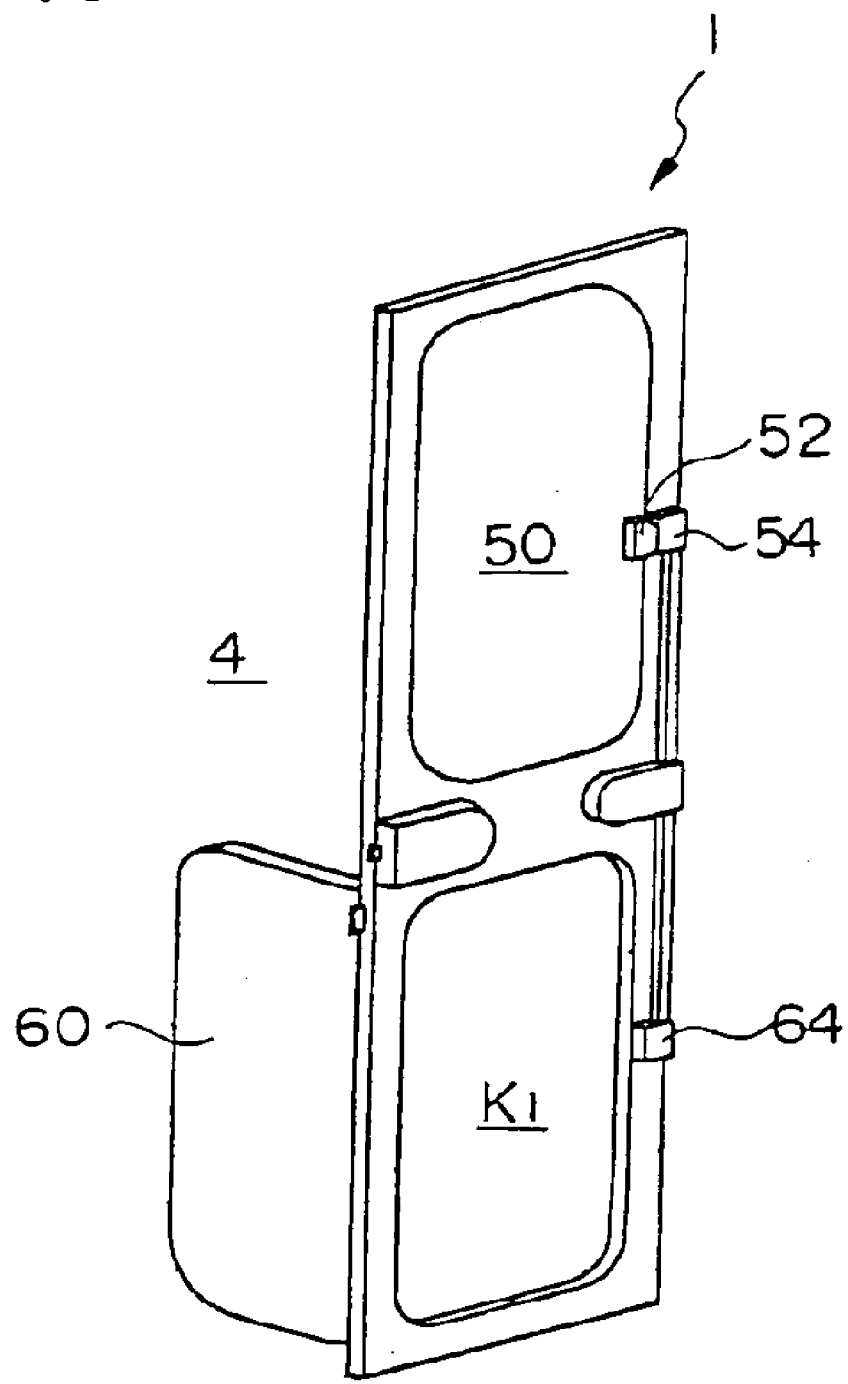
FIG. 3 is an explanatory view showing the action of the cockpit door according to the present invention.

FIG. 1 is a front elevational view showing the cockpit door of the present invention from the cockpit side, and FIGS. 2 and 3 are explanatory views showing the action of the cockpit door.

A cockpit door, the whole of which being designated by reference number 1, is fixed in a single swinging state to a frame 2 disposed on an opening formed to a partition wall for separating the cockpit from the passenger cabin.

The cockpit door 1 comprises a door body 10, and two small doors (hereinafter called flaps) 50 and 60 disposed vertically on the door body 10.

The door body 10 is equipped with a latch device 30 disposed on the side of the door facing the cockpit, and by operating a handle 34, a bolt 32 is engaged with and released from a catch (not shown) provided on the frame 2.

The door body 10 is fixed to the frame via four hinges 20, by which the door is enabled to open only toward the cockpit 3, as shown by arrow A of FIG. 2.

The two flaps 50 and 60 are mounted on the door body 10 by hinges not shown, and can only be opened toward the cabin as shown by arrow B.

The first flap 50 comprises a catch 52 disposed on the side rim portion thereof opposite from the hinge, and the catch 52 engages with a latch 54 disposed on the door body 10.

During an ordinary state, the latch 54 and the catch 52 of the first flap 50 are engaged, and the flap 50 is closed.

Similar to the first flap 50, the second flap 60 also comprises a catch 62 disposed on the side rim opposite from the hinge, which can be engaged with a latch 64 disposed on the door body 10. During an ordinary state, the latch 64 and the catch 62 of the second flap 60 are engaged, and the flap 60 is closed.

The door body 10 is equipped with a pressure sensitive device 70.

The pressure sensitive device 70 comprises a piston 72 that is actuated by the change in air pressure, and the movement of the piston 72 is transmitted through a rod 74 and causes the movement of latches 54 and 64 disposed on upper and lower ends of a rod 74. When the latches 54 and 64 are moved, they are released from the engagement with the catches 52 and 62.

When decompression occurs in the passenger cabin 4, the pressure sensitive device 70 senses the rapid fall of pressure, releases the engagement of the latch and the catch, so that the two flaps can open toward the side of the cabin 4, thereby reducing the difference in pressure between the cabin and the cockpit.

The second flap 60 can also be opened manually by a crew member by operating the latch 64, even if the cabin is not in a decompressed state.

Therefore, even if the cockpit door body 10 is stuck and cannot be opened due to some reason, the crewmember in the cockpit can go through an opening $K_1$ created by opening the second flap 60 and escape into the cabin 4. The cockpit door 1 according to the present invention comprises the basic structure as explained above.

Figure 4:
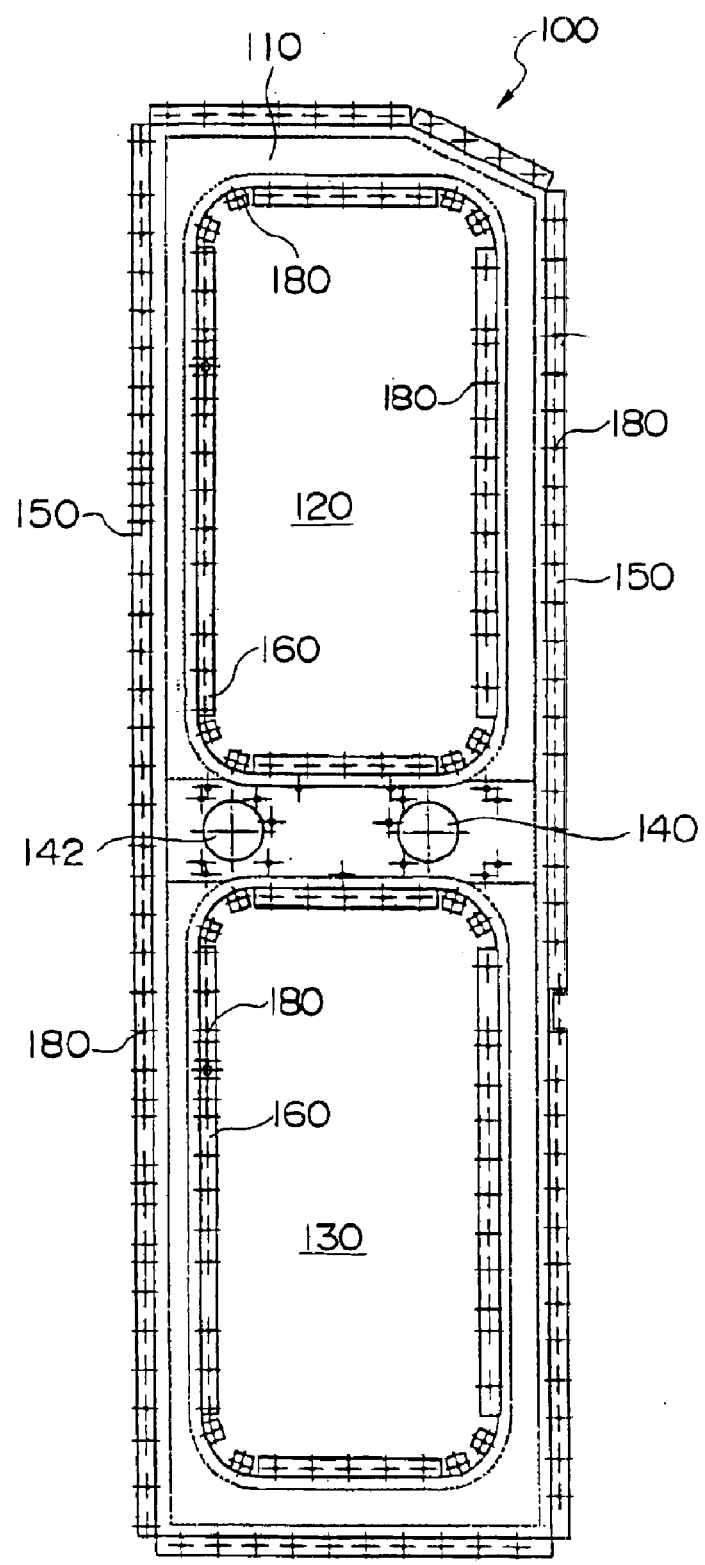
FIG. 4 is a front view of the reinforcement member for the door body of the cockpit door according to the present invention.

FIG. 4 is an explanatory view showing the structure of a reinforcement member fixed to an interior portion of the door body 10.

The reinforcement member, the whole of which being designated by reference number 100, comprises a body 110 formed by laminating and bonding together a multiple layer of aromatic polyamide fiber sheets.

This fiber sheet is light-weight but has high strength, and can be used to manufacture flak jackets or the like.

The fiber sheets are integrated with thermoplastic adhesive via hot pressing to create the reinforcement member body 110. A number of fiber sheets, for example, 20 sheets, are laminated to ensure necessary strength.

Instead of laminating 20 layers of fiber sheets at once, the laminated body can be formed by first creating a laminated body comprising five layers of fiber sheets, and then laminating four of these five-layered laminated bodies to acquire the reinforcement member body 110.

The reinforcement member body 110 comprises openings 120 and 130 corresponding to where flaps are located, and openings 140 and 142 corresponding to where the open/close mechanism of the door is to be disposed.

On the outer rim of the body 110 is formed a mounting portion 150 used for fixing the body 110 to the structural member (not shown) of the door. Similarly, amounting portion 160 is formed on the inner rim portion of the body 110. The mounting portions 150 and 160 are formed by reducing the number of layers of fiber sheets being laminated.

Mounting holes 180 for inserting rivets are formed on the mounting portions 150 and 160 with certain intervals.

The heat-treated body 110 has extremely high strength, but in the next step, the fixing portions 150 and 160 of the body 110 are bent 90 degrees.

Figure 5:
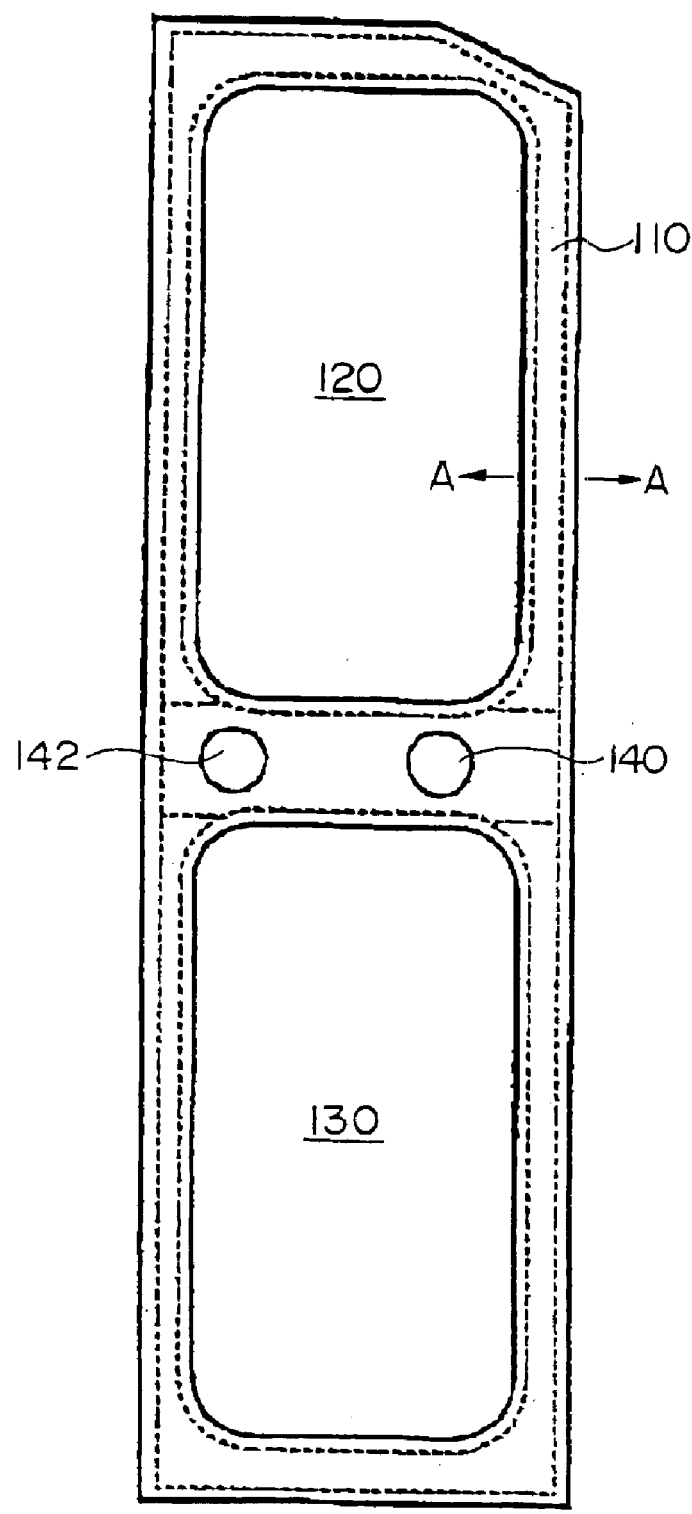
FIG. 5 is a front view of the reinforcement member for the door body of the cockpit door according to the present invention.
Figure 6:
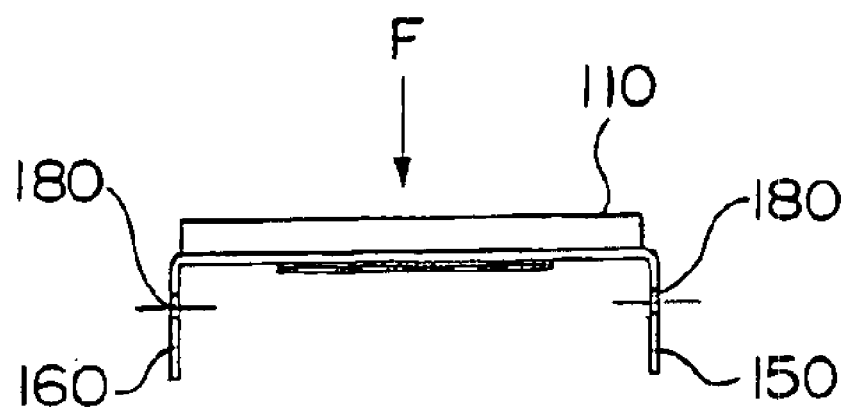
FIG. 6 is a cross-sectional view taken at A—A of FIG. 5.

FIG. 5 is a plan view of the body 110 in which the fixing portions are bent, and FIG. 6 is a cross-sectional view of arrow A—A of FIG. 5.

The reinforcement member body 110 is manufactured by laminating a number of fiber sheets, and the mounting portions 150 and 160 are formed by reducing the number of laminated sheets.

Holes 180 for inserting rivets are provided in advance to the mounting portions 150 and 160. Through use of these insertion holes 180, the reinforcement member 110 is fixed to a door frame not shown.

The rivets are inserted in the direction parallel to the planar surface of the member 110. Therefore, when impact force F in the perpendicular direction is loaded on the surface of the member 110, the rivets each receive force acting in the shearing direction. Since the rivets have higher endurance against the load in the shearing direction than against the load in the axial direction, the above-explained mounting structure enables the reinforcement member to exert sufficient strength.

Figure 7:
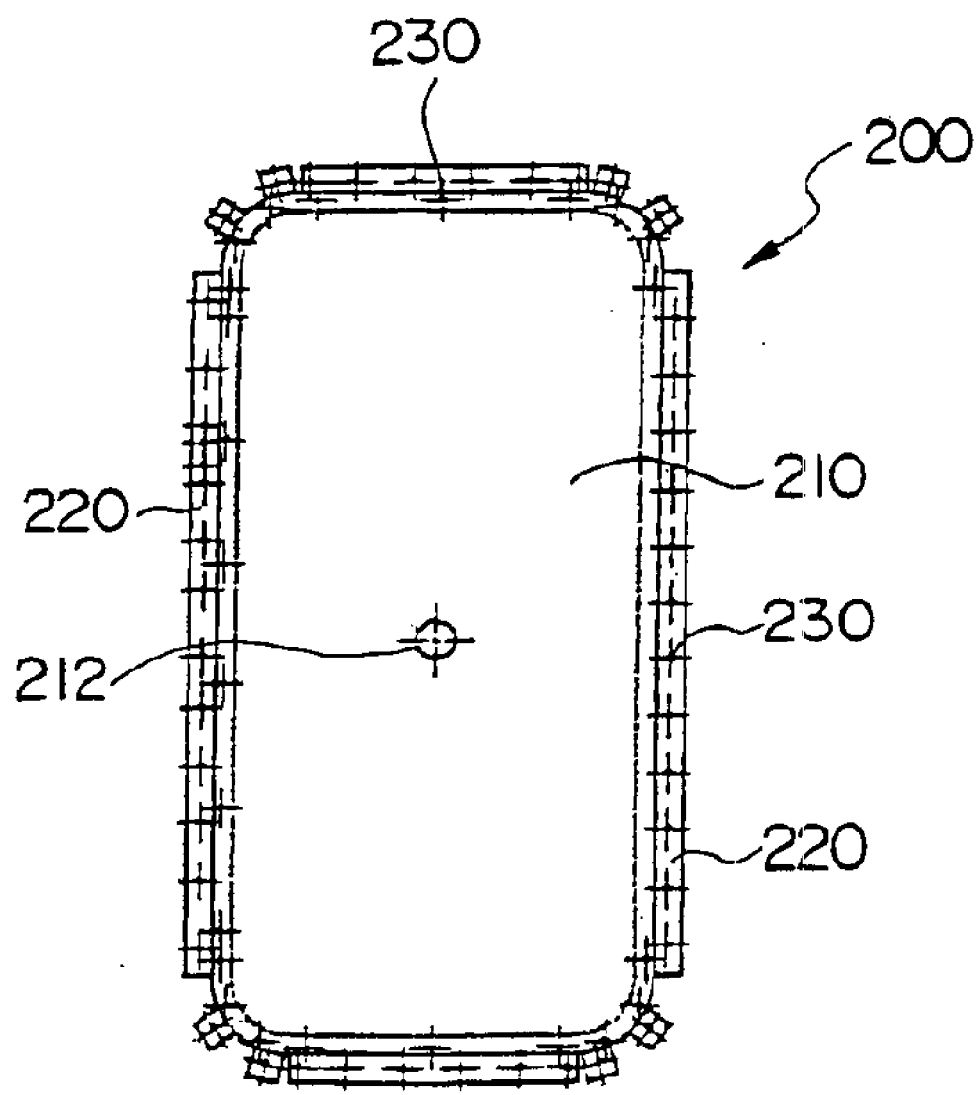
FIG. 7 is a front view showing the reinforcement member for the flap of the cockpit door according to the present invention.

FIG. 7 is a plan view of a flap reinforcement member to be fixed to the interior portion of the flap mounted on the cockpit door.

A reinforcement member body 210 of the flap reinforcement member 200 is also formed by laminating about 20 layers of aromatic polyamide fiber sheets and subjecting the multilayered body to hot pressing.

The body 210 is equipped with a necessary opening 212 and a mounting portion 220 formed to the outer rim area thereof. A number of rivet inserting holes 230 are machined to the mounting portion 220.

Figure 8:
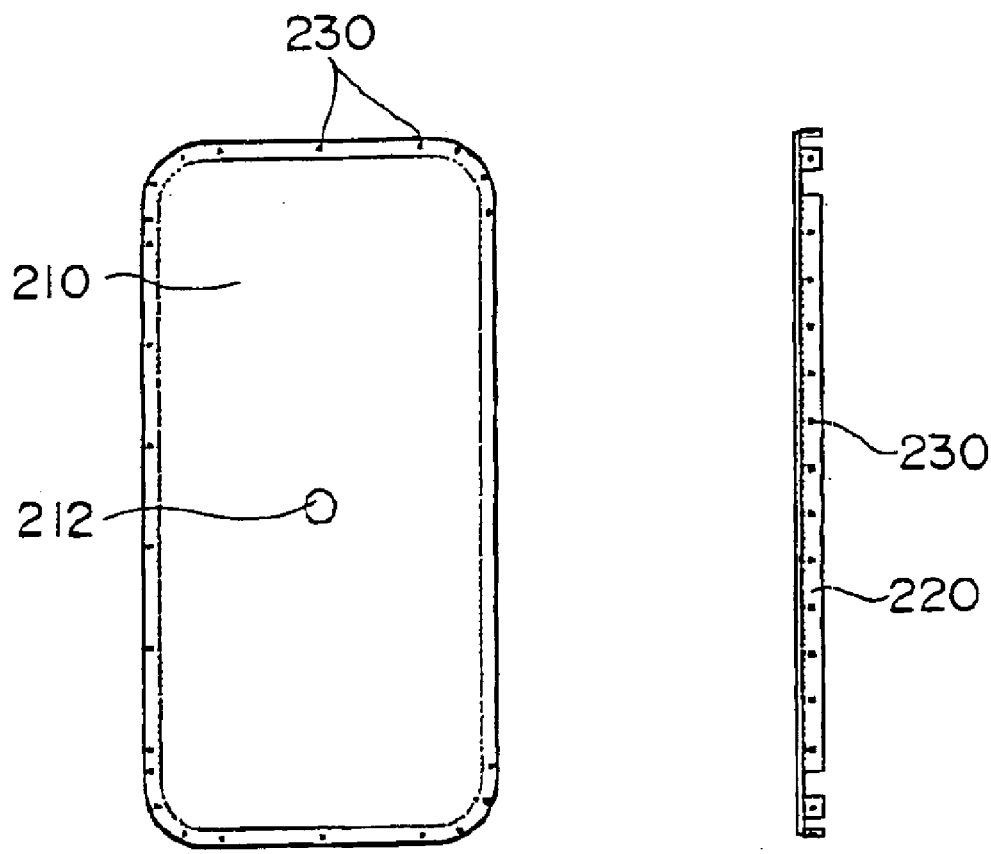
FIG. 8 is a front view and a side view of the reinforcement member for the flap of the cockpit door according to the present invention.

FIG. 8 illustrates a state in which the mounting portion 220 is bent by 90 degrees.

Figure 9:
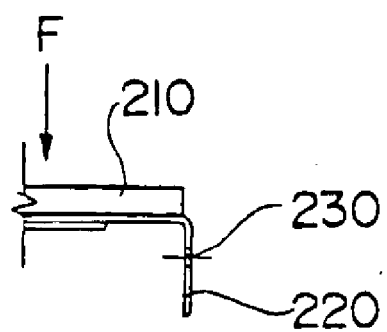
FIG. 9 is a cross-sectional view of FIG. 8.

As shown in FIG. 9, the mounting portion 220 bent perpendicularly is positioned to cover the frame of the flap, and thereafter, rivets are inserted to the holes 230 so as to fix the flap reinforcement member to the flap.

According to this structure, when a load in the direction of arrow F is placed on the reinforcement member of the flap, the rivets receive the shearing force and exert sufficient durability.

As explained, the cockpit door of the present invention comprises a laminated member formed by laminating and hot-pressing layers of aromatic polyamide fiber sheets with light weight and high strength, which is fixed securely on the frame of the door. When external force is loaded on the cockpit door, the impact strength is absorbed by the laminated member, protecting the cockpit door from damage.

What is claimed is:

1. A cockpit door of an aircraft interposed between a cockpit and a passenger cabin of the aircraft, the cockpit door comprising:

a reinforcement member fixed to an interior of the door, the reinforcement member comprising a body formed by laminating multiple layers of aromatic polyamide fiber sheets with thermoplastic adhesive and integrating the same via hot pressing, and a mounting portion formed to a rim portion of the body, the mounting portion bent 90 degrees and fixed to the door by rivets;

wherein the mounting portion is created by reducing the number of sheets being laminated compared to the body.

2. The cockpit door of an aircraft according to claim 1, wherein the door comprises a flap mounted to an inner area of the door via a hinge allowing the flap to be opened and closed, and a reinforcement member fixed to an interior of the flap, the reinforcement member comprising a body formed by laminating multiple layers of aromatic polyamide fiber sheets with thermoplastic adhesive and integrating the same via hot pressing, and a mounting portion formed to a rim portion of the body, the mounting portion bent 90 degrees and fixed to the flap by rivets.

3. The cockpit door of an aircraft according to claim 1 or claim 2, wherein the mounting portion has holes formed thereto through machining for inserting rivets.

4. The cockpit door of an aircraft according to claim 1 or claim 2, wherein the reinforcement member is formed by first laminating a small number of sheets and integrating the same via hot pressing to form a layered structure, and then laminating a predetermined number of the layered structure together.

* * * * *